United States Patent
Tareilus

(10) Patent No.: US 6,326,761 B1
(45) Date of Patent: Dec. 4, 2001

(54) POWER ELECTRONICS DEVICE FOR CONTROLLING AN ELECTRIC MACHINE

(75) Inventor: Alfred Tareilus, Schweinfurt (DE)

(73) Assignee: Mannesmann Sachs AG, Schweinfurt (DE)

(*) Notice: Subject to any disclaimer, the term of this patent is extended or adjusted under 35 U.S.C. 154(b) by 0 days.

(21) Appl. No.: 09/533,580

(22) Filed: Mar. 23, 2000

(30) Foreign Application Priority Data

Mar. 25, 1999 (DE) ............................................. 199 13 450

(51) Int. Cl.⁷ ............................................................ H05K 7/20
(52) U.S. Cl. ........................ 318/722; 361/699; 361/702; 363/141
(58) Field of Search ...................................... 318/138, 254, 318/439, 538, 722, 801; 361/679, 688, 689, 699, 702, 703, 704, 707, 709; 363/141

(56) References Cited

U.S. PATENT DOCUMENTS

| | | | |
|---|---|---|---|
| 4,668,898 | * 5/1987 | Harms | 318/254 |
| 4,763,224 | 8/1988 | Bentz et al. | 361/386 |
| 5,365,424 | * 11/1994 | Deam et al. | 363/144 |
| 5,497,289 | * 3/1996 | Sugishima et al. | 361/709 |
| 5,631,821 | * 5/1997 | Muso | 363/141 |
| 5,872,711 | 2/1999 | Janko | 363/144 |
| 5,914,860 | 6/1999 | Janko | 361/710 |
| 5,966,291 | * 10/1999 | Baumel et al. | 361/707 |
| 6,000,912 | * 12/1999 | Takada et al. | 417/32 |

FOREIGN PATENT DOCUMENTS

| | | |
|---|---|---|
| 196 09 243 A1 | 9/1997 | (DE) . |
| 0 373 434 | 6/1990 | (EP) . |
| 0 841 843 A1 | 5/1998 | (EP) . |
| 0 892 487 A1 | 1/1999 | (EP) . |

* cited by examiner

*Primary Examiner*—Bentsu Ro
(74) *Attorney, Agent, or Firm*—Cohen, Pontani, Lieberman & Pavane

(57) ABSTRACT

A power electronics device for controlling an electric machine including a power section arranged within a housing which can be closed via a cover element. The power section has a plurality of capacitors and a plurality of power semiconductors which are connected to a power bus bar. In addition, a control device is provided for controlling the power electronics device. The capacitors, power semiconductors, and control device are cooled via a cooling device which is formed as a profile having an essentially U-shaped cross section. The cooling device has two lateral limbs and a base region through which cooling ducts are arranged. A suitable cooling medium flows through the cooling ducts and the ends of the cooling ducts opposite the housing cover are closed by a covering element. The capacitors, the power semiconductors and the control device are connected to the cooling device such that thermal exchange occurs between these components and the cooling device.

16 Claims, 4 Drawing Sheets

POWER ELECTRONICS DEVICE FOR CONTROLLING AN ELECTRIC MACHINE

BACKGROUND OF THE INVENTION

1. Field of the Invention

The present invention relates to a power electronics device for controlling an electric machine.

2. Description of the Related Art

Electric machines comprise a wide variety of machines for converting energy from one form to another and include generators and motors. Among the many types of electric machines, synchronous machines are used for generating electrical energy. The electrical energy generated by the synchronous machine may then be applied to an extremely wide range of loads. These loads are usually combined into electrical networks which may, for example, comprise an on-board electrical network for a vehicle. When an electric machine is used in a vehicle, installation space is limited. Therefore, only a small installation space is available for the electric machine and the components required for operating the electric machine including a power electronics device. Accordingly, the individual components are required to be as compact and space-saving as possible. Furthermore, the engine or motor of a vehicle supplies the power to the individual components. Therefore, these components and specifically the power electronics must be particularly efficient to limit the amount of power consumed by the engine. This applies in particular in the vehicle industry sector, where new electrical components are always being introduced.

SUMMARY OF THE INVENTION

The object of the present invention is to provide a power electronics device for controlling an electric machine which is efficient and which has a compact design and therefore only a low installation space requirement.

According to an embodiment of the present invention, the object is achieved by a power electronics device for controlling an electric machine having a power section comprising a plurality of capacitors and a plurality of power semiconductors connected to a power busbar. The power electronics device further comprises a control device for controlling the power section and a cooling device which is connected to the capacitors, the power semiconductors, and/or the control device such that a thermal exchange occurs or can occur between these component(s) and the cooling device.

The power electronics device of the present invention has a compact design in which the individual components of the power section, the control device, and the cooling device are arranged in an optimized manner. This arrangement allows the power electronics device to have a low space requirement. As a result, the power electronics device according to the present invention is particularly suitable for use in the vehicle sector.

The configuration of the power electronics device depends to a very great extent on the required voltage level. For this reason, the number of capacitors and power semiconductors may vary depending on the application for which the power electronics device is designed. Therefore, the invention is not restricted to a specific number of capacitors and power semiconductors.

Power semiconductors which may be used are preferably MOSFETs, IGBTs or the like. However, other types of power semiconductors may also be used. The choice of the suitable power semiconductors is made in accordance with the power requirements of the power electronics device.

For example, if the power electronics device is to be used for example within the framework of a 42 V on-board network planned by the car industry, via which in the future newly introduced electrical components, such as windshield heating, electric valve drive and so on are to be operated, the power semiconductors will preferably comprise MOSFETs. If higher voltages are used, IGBTs are used.

The individual capacitors and power semiconductors are connected to a power busbar and are wired up, i.e., electronically interconnected, via the latter. The power busbar preferably consists of copper, but may comprise any electrically conductive material.

The control device is also provided in the power electronics device and may, for example, be constructed as a control circuit board. The control device preferably comprises surface-mounted devices (SMD) connected to a control circuit board using surface-mounting technology (SMT) and performs all the control, monitoring and regulating functions of the power electronics device including driving the power semiconductors. The control device preferably comprises a powerful microcontroller for controlling the power electronics device with all the functions of the microcontroller being predefined via a Controller Area Network (CAN) bus. Furthermore, the control device also has a device for the voltage supply. Depending on the requirements of the particular application, the control device may also comprise further elements.

The power electronics device according to the present invention further comprises a cooling device to dissipate the heat loss produced during the operation of the power electronics device in the capacitors, the power semiconductors, and/or the control device. The cooling device is connected to at least one of the above-mentioned elements in such a way that thermal exchange occurs or can occur between these and the cooling device. As a result, heat loss produced during operation is dissipated via the cooling device. The cooling device may, for example, be produced from a metal such as aluminum or the like.

The cooling device may advantageously be formed as a profiled element. For example, the cooling device may comprise an extruded profile or deep-drawn profile formed of a metal such as aluminum or other material which conducts heat. As a result, the cooling device may be produced particularly simply and cost-effectively.

The cooling device may comprise an essentially U-shaped cross section. Of course, depending on the requirement of the particular application in which the power electronics device is used, other cross sections such as, for example, an L-shaped cross section or the like, may also conceivably be used for the cooling device.

In a further refinement, the cooling device may comprise at least one cooling duct for conducting a cooling medium. The cooling duct allows the cooling medium to flow through the cooling device to further facilitate the dissipation of the heat loss. The cooling medium may, for example, comprise water or the coolant used in the cooling system of a vehicle.

In one embodiment according to the present invention, the cooling device comprises two lateral limbs and a base region. A cooling duct is provided in at least one of the lateral limbs and/or in the base region of the cooling device to facilitate the dissipation of the heat loss.

In a specific embodiment, an essentially U-shaped configuration of the cooling device ensures lateral cooling and cooling toward the bottom and from the bottom of the power electronics device.

In a further refinement, at least one connecting element is provided to connect the at least one cooling duct to a source of the cooling medium. The feed and the discharge of the cooling medium may be regulated via the at least one connecting element.

If the power electronics device is used in a motor vehicle, for example, the source of the cooling medium may comprise the conventional cooling circuit of the internal combustion engine. In this embodiment, the connecting element of the cooling device may be connected to the cooling circuit of the internal combustion engine, so that the cooling water circulating in the internal combustion engine also flows through the cooling device of the power electronics. In this embodiment, additional coolers, pumps or other equipment for a cooling system is not required because the equipment already exists for the cooling circuit of the internal combustion engine of the motor vehicle. This arrangement has particular advantages with regard to the costs and the space requirement of the power electronics device.

In a further embodiment, the capacitors may be arranged within a chamber formed by the lateral limbs and the base region of the cooling device. This arrangement ensures the lateral cooling of the capacitors and their cooling from below.

Furthermore, the power semiconductors may be advantageously arranged outside the lateral limbs. In this case, optimal lateral cooling of the power semiconductors may also be achieved, because the lateral limbs of the cooling device are located between the power semiconductors and the capacitors. This arrangement of the cooling device eliminates any mutual hindrance relating to the cooling of the capacitors and the power semiconductors which may occur for constructional reasons. Furthermore, the installation space located between the power semiconductors and the capacitors is utilized optimally by the lateral limbs of the cooling device, which has a positive effect on the space requirement of the power electronics device.

The control device may be advantageously arranged underneath the base region of the cooling device. In particular, when at least one cooling duct is also provided in the base region of the cooling device, optimal cooling of the control device is also ensured.

The power busbar of the power section preferably comprises a plurality of connecting elements. The connecting elements may, for example, comprise the DC terminals U+, U− for the battery and the three-phase connections U, V, W to the electric machine. The connecting elements are in particular constructed as cable terminals by means of screw fittings using, for example, PG threads. Alternatively, the connecting elements may comprise high-current plug-in connectors or the like.

In a further refinement, the control device of the power electronics device has at least one connecting element. The connecting element is advantageously a plug-in signal connector or other signal connector.

In a further embodiment, the power electronics device comprises a housing to accommodate the power section, the control device and the cooling device. The housing may be produced, for example, as a deep-drawn aluminum part. Of course, other types of productions and materials for the housing are also conceivable.

In a preferred embodiment of the power electronics device according to the present invention, the capacitors of the power section are arranged in a row centrally along a longitudinal extension of the housing and are flanked by two rows of power semiconductors. Accordingly, the power semiconductors are located between the housing wall and the capacitors. In this embodiment, the lateral limbs of the cooling device are located between the capacitors and the power semiconductors. Accordingly, the power semiconductors are shielded by the housing wall and the lateral limbs of the cooling device.

The housing is preferably closed on all sides apart from an opening which is made in particular in one of the ends of the housing. This arrangement of the housing prevents contamination or moisture from penetrating the power electronics from the outside and damaging them.

A cover element is provided to close the opening in the housing. The cover element is detachably connected to the housing so that the components located in the housing may be easily accessed and removed from the housing and subsequently reinserted, for example, during maintenance or repair of the components. To prevent the ingress of dirt or moisture into the housing via the housing opening, a suitable sealing element may be advantageously provided between the cover element and the housing.

The cover element advantageously has a number of openings for the various connecting elements described further above to be led through. As a result, all the necessary electrical connections and those connection required for cooling are arranged on one side of the housing. This arrangement simplifies the installation of the power electronics, for example in the engine compartment of a vehicle. In this embodiment, the cover element functions as a connecting board for the power electronics.

The cooling ducts are advantageously closed, on the side located opposite the cover element of the housing, by one or more covering elements which may, for example, comprise sheet-metal covering plates. The individual cooling ducts of the cooling device may be connected in series or in parallel via the covering elements. The various possible connection may be used to modify the pressure relationships and flow relationships in the cooling circuit.

In a special embodiment, these covering elements may also function, for example, as a second cover element for the housing. In this case, the actual housing may be constructed as a tubular element, into which the elements of the power electronics are inserted and arranged. The tubular housing, which is opened at its two opposing ends, is closed in the manner described above by two cover elements. One of the cover elements may be arranged as a connecting board and the other cover element may be arranged for connecting up the cooling ducts. A housing constructed according to this embodiment may be produced particularly simply and cost-effectively.

The power electronics device according to the invention is required to be particularly powerful. However, the arrangement of the individual components according to the embodiments of the present invention allow the heat loss produced in the individual elements to be advantageously dissipated via the cooling device configured in accordance with the present invention. Furthermore, the arrangement of the individual components also permits a compact and therefore space-saving design of the power electronics device.

The power electronics according to the invention may advantageously be used for controlling a synchronous machine, in particular a permanently excited synchronous machine.

In particular, the power electronics device according to the present invention may be arranged for controlling a starter-generator, more specifically, a starter-generator for a vehicle. In this context, the starter-generator is an electric machine whose rotors are mounted via the crankshaft mounting of an internal combustion engine of a vehicle. The starter-generator is used for starting and stopping the engine and also performs various functions during engine operation, such as braking functions, booster functions, battery management, active vibration damping, and synchronization of the internal combustion engine.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

FIGS. 1 to 5 illustrate a power electronics device 10 according to an embodiment of the present invention for controlling an electric machine comprising a starter-generator for a motor vehicle and constructed as a permanently excited synchronous machine.

Figure 1:
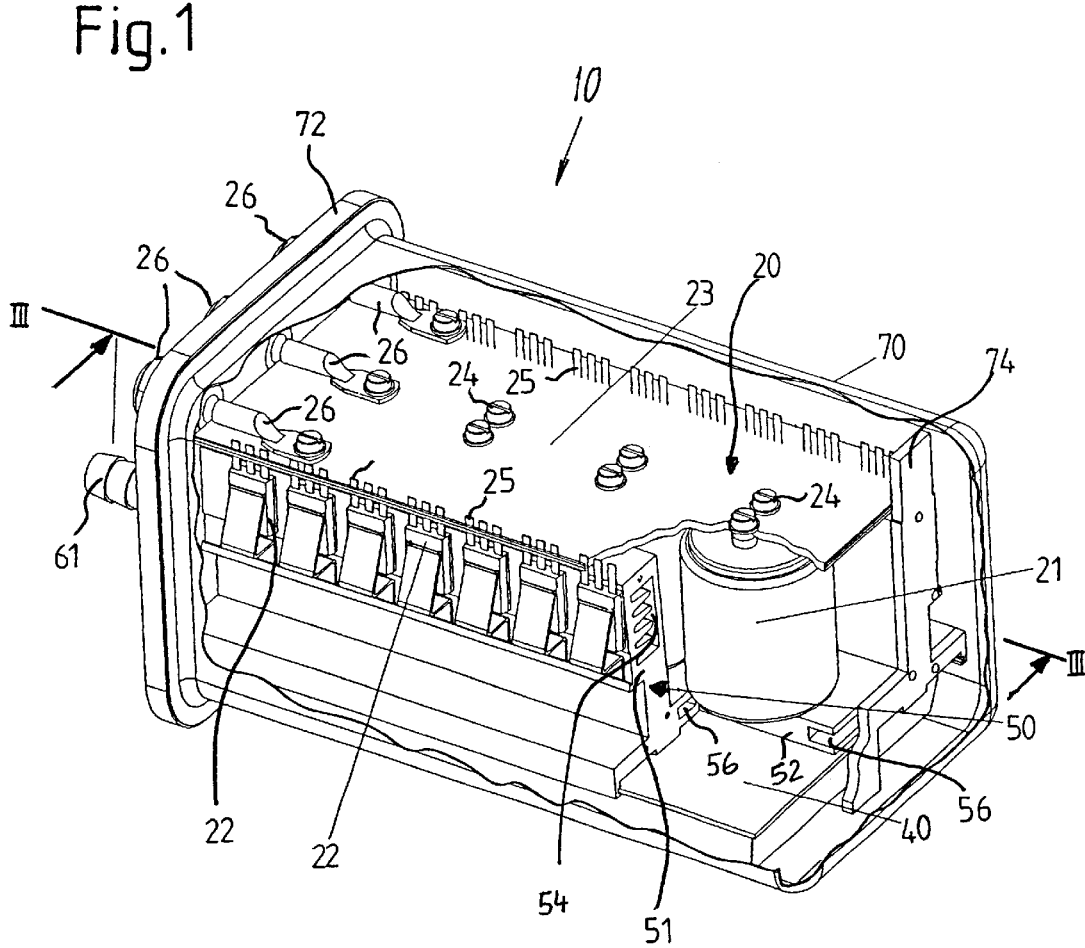
FIG. 1 is an elevated rear perspective and partial sectional view of an embodiment of a power electronics device according to the present invention.

FIG. 1 shows a housing 70 for the power electronics device 10 which is produced as a deep-drawn aluminum part. The housing 70 is closed on all sides apart from a housing opening 71 (see FIG. 3) at one end. A cover element 72 is used to close the housing opening 71 and is detachably connected to the housing 70. The cover element 72 has a number of openings 73 (see FIG. 4), through which a number of connecting elements may be led. The cover element 72 thus functions as a connecting board for the power electronics device 10.

Figure 2:
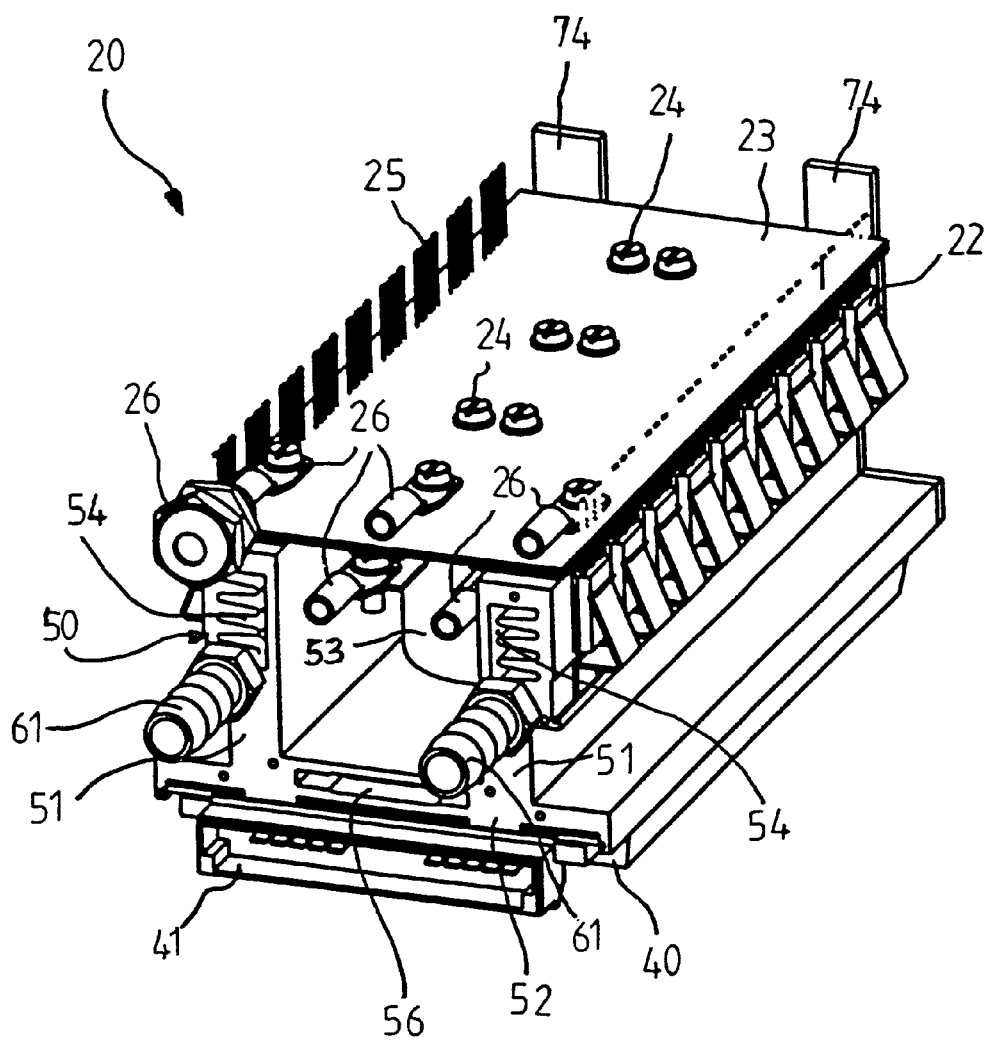
FIG. 2 is an elevated frontal perspective view of the power electronics device of FIG. 1 without a housing.
Figure 4:
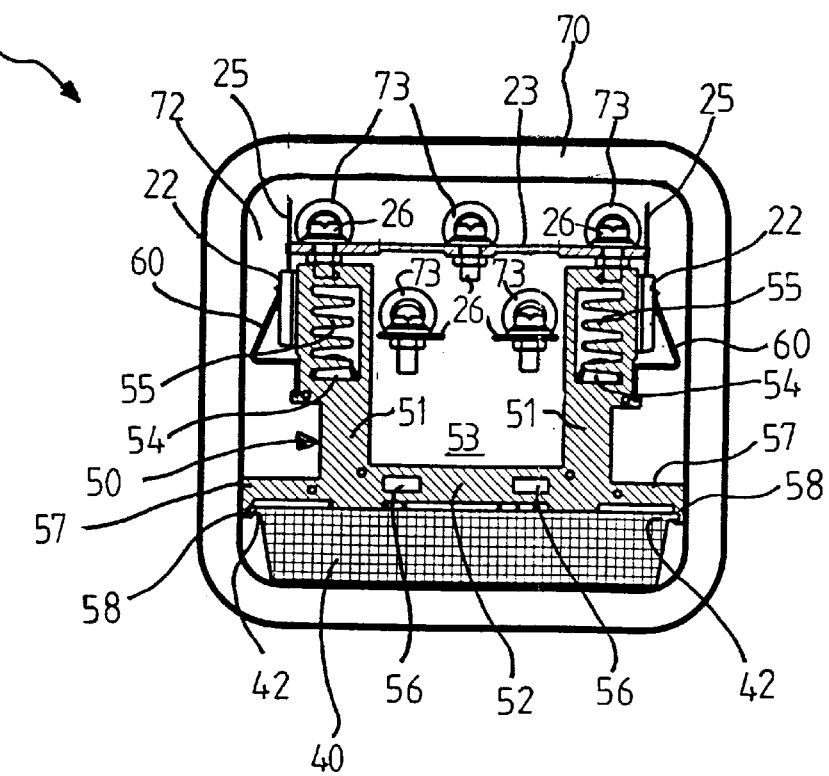
FIG. 4 is a sectional view of the power electronics device of FIG. 3 along the section line IV—IV shown in FIG. 3.
Figure 5:
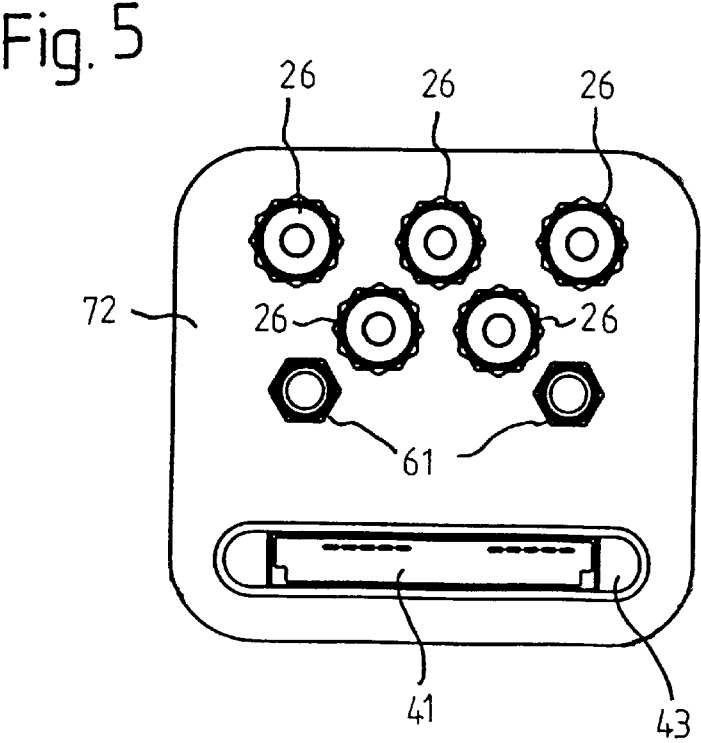
FIG. 5 is a front view of the cover element of the housing for the power electronics device according to the present invention.

FIG. 5 shows that the connecting elements include five electrical power connecting elements 26. Referring now to FIGS. 1 and 2, the electrical power connecting elements 26 are connected to a power section 20 of the power electronics device 10. The connecting elements further include two coolant connecting elements 61. A cooling device 50, which will be described in more detail below, may be connected to a source of a cooling medium via these coolant connecting elements 61. Finally, a control connecting element 41 for a control device 40 (see FIGS. 1 to 4) is also arranged through the cover element 72.

FIGS. 1 to 4 show that the power electronics device 10 has a power section 20. The power section 20 comprises a plurality of capacitors 21. In the present exemplary embodiment, a total of three capacitors 21 are illustrated. However, any number of capacitors 21 may be used depending on the particular application in which the power electronics device is arranged. The capacitors 21 are connected via a screw connection 24 to a power bus bar 23. The power bus bar 23 preferably comprises more than one layer of copper with insulators inserted between the conductive layers. Alternatively, the power bus bar 23 may comprise any known electrical conductor instead of copper.

The power section 20 also has a plurality of power semiconductors 22, which are likewise connected to the power bus bar 23. Instead of screw connections, each of the power semiconductors 22 are connected to the bus bar 23 via a plug-in connection 25. For this purpose, the power semiconductors 22 have a number of tabs, which are pushed through the power bus bar 23 and connected to the latter, for example, via a solder connection. Of course, other known electrical connection options may also be used for connecting the power semiconductors 22 and the capacitors 21 to the power bus bar 23. Among others, crimp connections, connections by sleeves, and welded connections, such as ultrasonic welding, may be used. The invention is not restricted to specific types of connections.

In the present case, the power semiconductors comprise MOSFETs. Both the capacitors 21 and the power semiconductors 22 are wired up via the power busbar 23. The electrical power connecting elements 26 connected to the power busbar 23 include high-current DC terminals U+ and U− for the battery and three-phase output terminals U, V, W which are connected or are connectable to the electrical machine. The electrical power connecting elements 26 are preferably constructed as cable terminals by threaded fittings (i.e., PG threaded coupling) or as high-current plug-in connectors.

The capacitors 21 are arranged in a row centrally in the housing 70 and are flanked by two rows of power semiconductors 22, so that the power semiconductors 22 are located between the side wall of the housing 70 and the capacitors 21.

To dissipate the heat loss produced during the operation of the power electronics 10 in the power semiconductors 22 and the capacitors 21, a cooling device 50 is arranged in the power electronics device 10. The cooling device 50 may comprise an aluminum deep-drawn profile or an extruded profile and has an essentially U-shaped cross section. It has two lateral limbs 51 and a base region 52. The capacitors 21 are arranged in a chamber 53 formed by the lateral limbs 51 and the base region 52. Therefore, cooling of the capacitors 21 may be effected both in the lateral direction and toward the bottom and from the bottom. The power semiconductors 22 are arranged outside the lateral limbs 51 of the cooling device 50. This ensures lateral cooling of the power semiconductors 22 via the lateral limbs 51, without hindering the cooling between the capacitors 21 and the power semiconductors 22.

Referring to FIG. 4, a cooling duct 54 is arranged in each of the lateral limbs 51 of the cooling device 50 to assist the cooling action of the cooling device 50. Each of the cooling ducts 54 further comprises a plurality of cooling ribs 55. The cooling ribs enlarge the surface area within the cooling ducts 54, thereby increaseing the heat exchange for particularly advantageous cooling.

FIG. 4 also shows two cooling ducts 56 arranged in the base region 52 of the cooling device 50.

The cooling ducts 54, 56 are arranged so that a suitable cooling medium flows therethrough. The cooling ducts 54, 56 are connected to a source (not illustrated) of a cooling medium such as, for example, water or the like, the connection being made via the coolant connecting elements 61. Since, in the present exemplary embodiment, the power electronics device 10 is used in conjunction with a starter-generator for a vehicle, the conventional cooling circuit of the internal combustion engine may be used as source of the cooling medium. As a result, additional coolers and pumps for circulating the cooling medium through the power electronics device 10 are not required.

At the end of the cooling ducts opposite from the cover element 72, the cooling ducts 54, 56 are closed by a covering element 74. The covering element 74 is arranged for connecting the individual cooling ducts 54, 56 in either a series or parallel connection by which means the pressure relationships and the flow relationships in the cooling device 50 may be adjusted.

Figure 3:
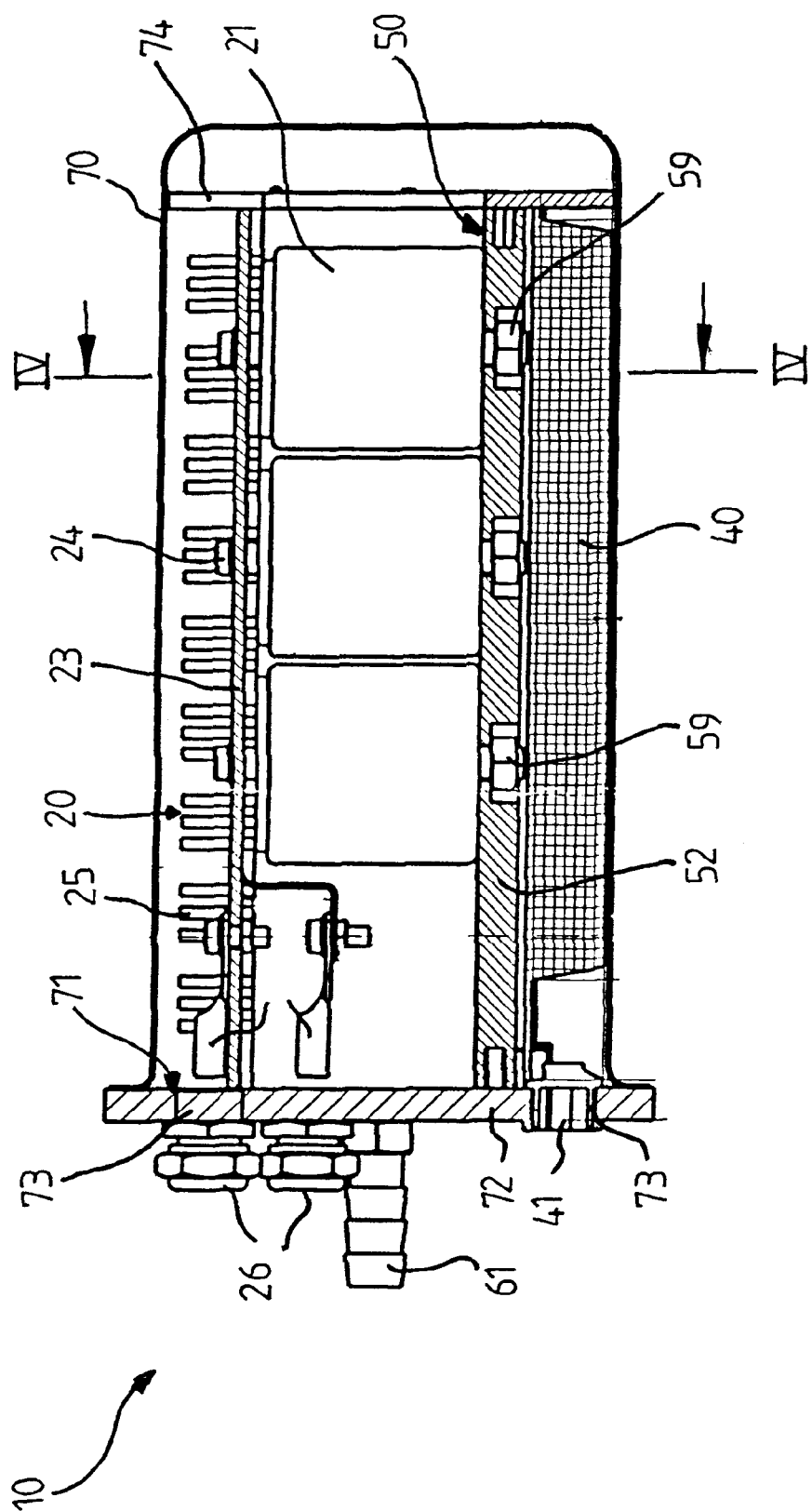
FIG. 3 is a sectional view of the power electronics device of FIG. 1 along the section line 1II—III shown in FIG. 1.

To ensure a good cooling action, the cooling device 50 is operatively arranged in the power electronics device 10 such that a thermal exchange occurs between the components of the power section 20 (i.e., the capacitors 21 and the power semiconductors 22) and the cooling device 50. Referring to FIGS. 3 and 4, the thermal exchange between these components may be achieved by connecting the capacitors 21 to the base region 52 of the cooling device 50 via a screw connection 59. Furthermore, the power semiconductors 22 may be fixed onto the lateral limbs 51 of the cooling device 50 via a clamp connection 60.

To operate the power electronics device 10, a central control device 40 constructed as a circuit board is operatively arranged therein for performing all the control, monitoring, and regulating functions including driving the power semiconductors 22. The circuit board of the central control device 40 is preferably implemented using surface mount devices (SMD) and constructed using surface-mounting technology (SMT). The control device 40 is arranged underneath the base region 52 of the cooling device 50. As a result, the control device 40 may likewise be cooled by the cooling action acting downward via the base region 52 of the cooling device 50.

To ensure that a thermal exchange takes place or can take place between the control device 40 and the cooling device 50, the control device 40 comprises a guide rail 42 along each of its two side edges. The guide rails 42 are inserted into corresponding grooves 58 in the base region 52 of the cooling device 50. Since the control device 40 is generally wider than the base region 52 of the cooling device 50, the base region 52 comprises extensions 57 extending past the lateral limbs 51 in both lateral directions. The extensions 57 are dimensioned such that they compensate for the difference in width between the control device 40 and the base region 52. The grooves 58 are arranged in the edge regions of the extensions 57 such that the control device 40 may be inserted into the cooling device 50 and also arranged firmly against the lower surface of the base region 52 of cooling device 50 so that an adequate heat exchange can take place between the control device 40 and the cooling device 50.

The configuration of the power electronics device 10 according to the present invention ensures that the sensitive components are neither contaminated nor damaged by dirt or moisture. The protection of the components in the power electronics device 10 is accomplished by the essentially one-part configuration of the housing 70. To prevent the ingress of dirt or moisture via the housing opening 71, a suitable sealing element is advantageously provided between the cover element 72 and the housing 70. Since the cover element 72 is detachably connected to the housing 70, the housing 70 may simply be opened for the purposes of maintenance or repair of the power electronics 10 and subsequently closed again.

In a further embodiment, the housing 70 may be constructed as a tubular element open on both sides. On a first side, the housing opening 71 of the housing 70 is closed by the cover element 72. On the opposing second side, the covering element 74 may be constructed in such a way that it can function as a further cover element for the housing 70. The tubular housing of this embodiment may be produced particularly simply and cost-effectively.

As a result of the arrangement of the capacitors 21, the power semiconductors 22, the power busbar 23 and the control device 40 according to the present invention, a compact and therefore space-saving design of the power electronics device 10 is achieved. As a result of the configuration of the cooling device 50, which in each case extends into the interspaces between the power semiconductors 22, the capacitors 21 and the control device 40, the interspace existing between the the capacitors 21, the power semiconductors 22, the power busbar 23 and the control device 40 may be utilized in an optimum way. This arrangement facilitates a further saving in the necessary installation space for the power electronics device 10.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A power electronics device for controlling an electric machine, comprising:
   a power section including a plurality of capacitors and a plurality of power semiconductors interconnected via a power bus bar;
   a control device operatively connected to said power section for controlling said power section; and
   a cooling device comprising at least one cooling duct for conducting a cooling medium, said cooling device operatively arranged relative to at least one of said capacitors, said power semiconductors, and said control device such that heat generated during operation is removable from said at least one of said capacitors, said power semiconductors, and said control device via a thermal exchange with said cooling device, wherein said cooling device comprises an extruded profile and said at least one cooling duct includes cooling ribs formed therein for increasing the surface area of said at least one cooling duct.

2. The power electronics device of claim 1, wherein cooling device comprises a profiled element comprising an essentially U-shaped cross section.

3. The power electronics device of claim 1, wherein said cooling device comprises two lateral limbs and a base region and said at least one cooling duct arranged in at least one of said two lateral limbs and said base region for conducting a cooling medium.

4. The power electronics device of claim 3, wherein said capacitors are arranged within a chamber formed by said two lateral limbs and said base region of said cooling device.

5. The power electronics device of claim 4, wherein said power semiconductors are arranged outside said two lateral limbs.

6. The power electronics device of claim 5, wherein said control device is arranged beneath said base region.

7. The power electronics device of claim 3, wherein said power semiconductors are arranged outside said two lateral limbs.

8. The power electronics device of claim 3, wherein said control device is arranged beneath said base region.

9. The power electronics device of claim 1, further comprising at least one connecting element for connecting said at least one cooling duct to a source of the cooling medium.

10. The power electronics device of claim 1, wherein power bus bar has a plurality of electrical power connecting elements.

11. The power electronics device of claim 1, wherein the control device has at least one control signal connecting element.

12. The power electronics device of claim 1, further comprising a housing accommodating said power section, said control device and said cooling device.

13. The power electronics device of claim 12, further comprising a cover element, said housing comprising a housing opening at one end, and wherein said cover element being detachably connected over said housing opening.

14. The power electronics device of claim 13, wherein said cooling device comprises at least one coolant connecting element for connecting said at least one cooling duct to a source of the cooling medium, said power bus bar has a plurality of electrical power connecting elements, and said control device has at least one control signal connecting element, and wherein said cover element comprises a plurality of openings through which said at least one coolant connecting element, said plurality of electrical power connecting elements and said at least one control signal connecting element are led.

15. The power electronics device of claim 1, wherein said power electronics device is connectable to a permanently excited synchronous machine for controlling said permanently excited synchronous machine.

16. The power electronics device of claim 1, wherein said power electronics device is connectable to a starter-generator for a vehicle for controlling said starter-generator.

* * * * *